Nov. 20, 1945.  R. H. WHEMPNER  2,389,476
SUPERVISORY SYSTEM AND PERCEPTIVE INDICATOR THEREFOR
Filed May 3, 1943  2 Sheets-Sheet 1
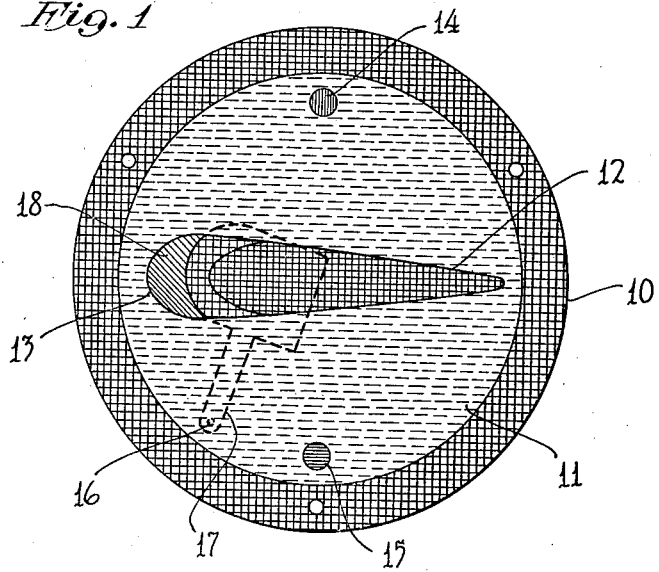
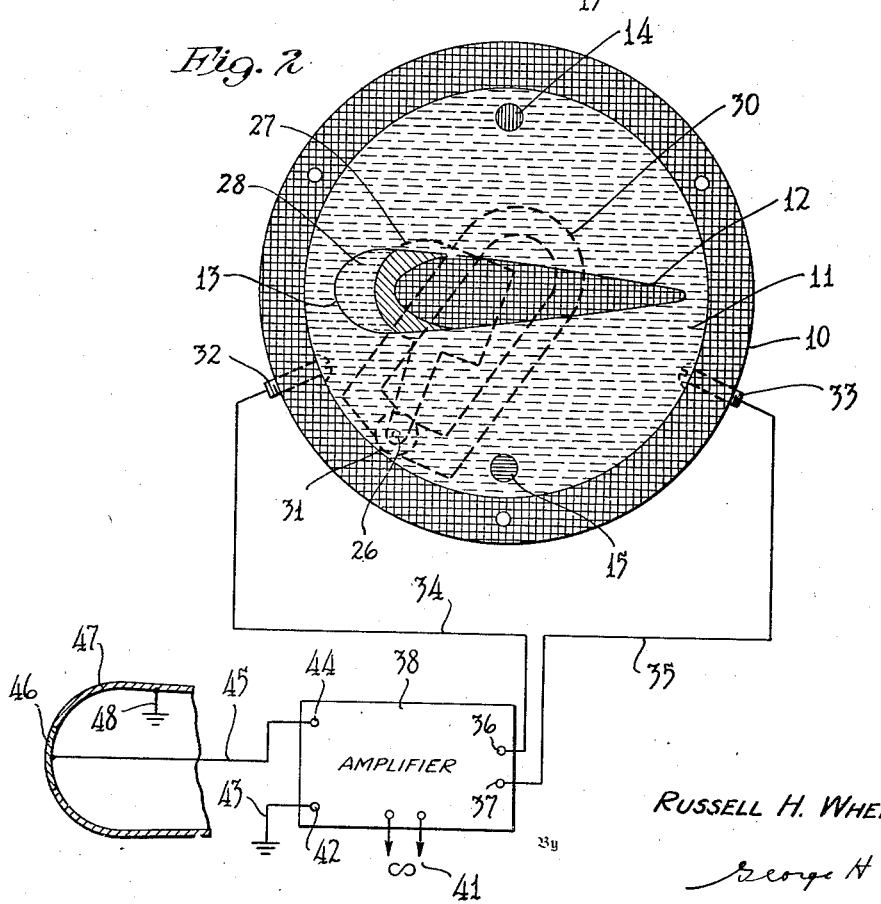
Inventor
RUSSELL H. WHEMPNER
George H Fisher
Attorney Nov. 20, 1945. R. H. WHEMPNER 2,389,476
SUPERVISORY SYSTEM AND PERCEPTIVE INDICATOR THEREFOR
Filed May 3, 1943 2 Sheets-Sheet 2
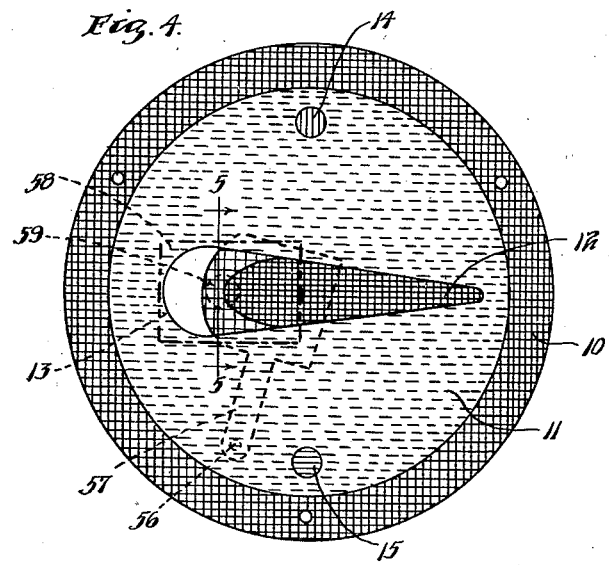
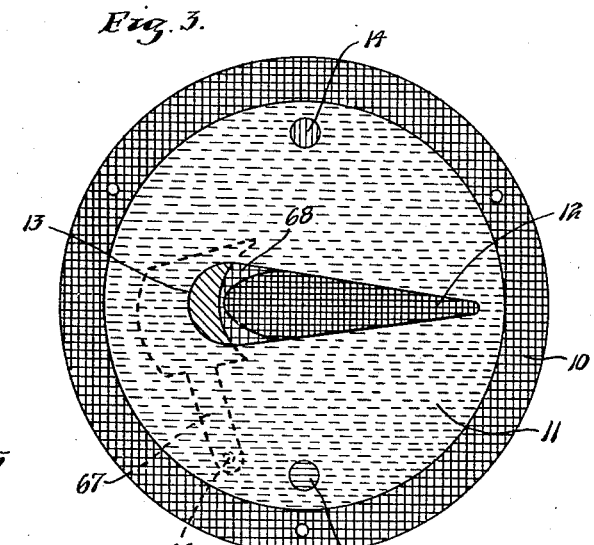
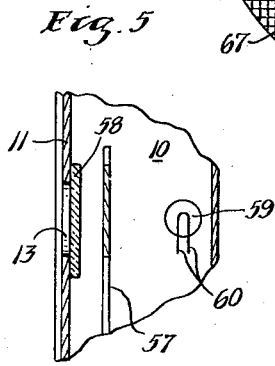
Inventor
RUSSELL H. WHEMPNER
By
George H. Fisher
Attorney Patented Nov. 20, 1945

2,389,476

UNITED STATES PATENT OFFICE 2,389,476

SUPERVISORY SYSTEM AND PERCEPTIVE INDICATOR THEREFOR

Russell H. Whempner, Minneapolis, Minn., assignor to Minneapolis-Honeywell Regulator Company, Minneapolis, Minn., a corporation of Delaware Application May 3, 1943, Serial No. 485,449

11 Claims. (Cl. 177—311)

This invention relates generally to the art of supervisory systems and more particularly to such systems having indicators which are mechanically responsive to electrical energization. Specifially, my invention relates to a supervisory system and indicator for the presence of accretions of ice on wing and other surfaces in aircraft, and for indicating approximately the magnitude of such accretion.

The phenomenon of icing on wing and other surfaces of aircraft due, for example, to the impingement thereon of super-cooled air containing water vapor is well known. Various methods for ascertaining and indicating the presence of ice on these surfaces have been developed, as well as various means for removing the ice accretions once they have formed. These methods in general depend on electrical detecting, measuring and indicating methods, and the icing indicator has been conventionally still another meter on the control panel. As is well known, the control panel of a large modern aircraft comprises a great multiplicity of indicating meters of various natures, all banked closely together and all conventionally comprising an indicating needle moving over a graduated scale. It will be realized that the work of a pilot is greatly complicated by having to carry in mind the variable whose variation each meter indicates, and to scrutinize the variously graduated scales to determine the relative position of the indicating needle. It becomes increasingly complicated when it is remembered that the proper indication for each needle, that is, the range of positions of the needle indicating satisfactory operation of the device or circuit which is operative on the needle, may be different for each meter. An object of my invention is to provide an indicating device which is substantially free from these disabilities.

It will also be obvious from a study of the present application, that when a meter has been provided which by its shape, color, arrangement of parts, or other perceptive feature, conveys this information without conscious or unconscious analysis, the work of the pilot is thereafter greatly reduced. It is an object of my invention to provide such a meter for use as an indicator of icing on airfoil surfaces.

It is another object of my invention to provide a new and improved icing indicating means in combination with means for detecting such icing.

Various other objects, advantages and features of novelty which characterize my invention are pointed out with particularity in the claims annexed to and forming a part of this invention. However, for a better understanding of the invention, its advantages and objects attained with its use, reference should be had to the subjoined drawings which form a further part of this specification and to the accompanying descriptive matter, in which I have illustrated and described certain preferred embodiments of the invention.

In the drawings,

Figure 1 is an elevation of one embodiment of the indicator portion of my invention in a position to indicate partial icing;

Figure 2 is an elevation of a different modification of the indicator portion of my invention in a position indicating partial icing, shown schematically in an operative circuit for use as an icing indicator. Both figures are hatched to bring out more clearly contrasted appearances which form an important part of my invention;

Figure 3 is an elevation, similar to Figure 1, of another embodiment of the indicator portion of my invention;

Figure 4 is a similar elevation of yet a further embodiment of the indicator portion of my invention; and Figure 5 is a fragmentary sectional view taken along the line 5—5 of Figure 4.

In the drawings, reference 10 refers to the usual flanged glazed housing of a meter, for example a direct current milliammeter. The meter is provided with a dial 11 upon which is imprinted in a contrasting color or material the outline of an airfoil section 12. A portion of this section as shown at 13 is made light transmitting, either by simply cutting away of an opaque dial material entirely, or by inserting into the opening a translucent or transparent window. Dial 11 also bears signal lamp jewels 14 and 15 as is well known in the art, for visually conveying to the operator intelligence with respect to the state of operation of associated devices. A shaft 16 is provided as an extension of the armature of the rotating coil of the meter, as shown in Figure 2, and to this shaft is made fast a vane 17 of thin metal or other opaque material. Thus, it will be apparent that upon the passage of electric current through the meter, the vane 17 will be rotated through an angle proportional to the magnitude of such current. In the embodiment shown in Figure 1, the normal or zero position of the vane is counter-clockwise of that shown, and on increasing the electric current through the meter, the vane rotates in a clockwise direction around the center of the shaft 16, gradually uncovering the translucent window beginning at the left-hand end as seen in the figure.

The visible surface of vane 17 and the surface of the airfoil section 12 are of the same appearance. A backing member 18 is provided behind vane 17 and the window 13, and this backing member has a surface appearance which contrasts strongly with that of vane 17 and airfoil section 12, and also with dial 11. The trailing edge of vane 17 is cut in the shape of an arc to give visual significance to its clockwise movement when the meter is energized. Therefore, clockwise motion of vane 17 will cause an increasingly large crescent of contrasting appearance to be evident at the end of the airfoil section, and the size of this crescent will bear the same relationship to the current passing through the meter as do the indications of the ordinary meter. If the meter is arranged in a circuit in which its indication is proportional to actual icing conditions, then the thickness of the crescent exposed by withdrawal of the vane 17 will be proportional to the amount of icing on the airfoil itself.

It will be obvious to those skilled in the art, that provision of backing plate 18 is not essential to the invention which I conceive to be broad enough to contain the following expedient and others which are mechanically equivalent. Translucent portion 13 may comprise a piece of ground glass or matte Celluloid, and there may be provided therebehind a source of illumination.

Such a structure is illustrated in Figures 4 and 5, in which elements indicated by reference numerals 10, 11, 12, 13, 14, and 15 are the same as those indicated in connection with Figure 1. A vane 57 is carried for rotation by a shaft 56, in a manner similar to vane 17 on shaft 16, and the normal position of the vane is again counter-clockwise of that shown, so that it completely covers the light transmitting portion 13 of dial 11. A translucent window 58 of ground glass, for example, is mounted in any desired fashion immediately behind portion 13, and vane 57 moves between window 58 and a lamp 59 which is mounted in the case in any suitable fashion and which may be of any suitable type. I have shown lamp 59 as being an electric light bulb supplied with electrical energy through a pair of conductors 60 adapted for connection with any suitable source of electrical energy.

In this structure, energization of the meter causing rotation of shaft 56 rotates vane 57 in a clockwise direction, removing its shadow from increasingly larger portions of window 58. The trailing edge of vane 57 is cut in the shape of an arc to give visual significance to its clockwise movement when the meter is energized. As a result, an increasingly large luminous crescent appears at the left end of airfoil section 12 with increasingly electrical energization of the meter.

It will also be obvious to those skilled in the art that the diversity in appearance between backing plate 18 and vane 17 and section 12 is not necessarily of the nature indicated. For example, I have shown in Figure 3 an embodiment of my invention in which backing plate 18 is of the same appearance as section 12, and in which vane 67 is of an appearance contrasting both with members 12 and 68 and with dial 11. In this figure also reference numerals 10, 11, 12, 13, 14, and 15 have the same connotations as in Figure 1. The normal position of vane 67 is counter-clockwise of that shown, so that it is completely concealed behind dial 11 and no part of it is perceptible through the light transmitting portion. The leading edge of vane 67 is cut in the shape of an arc to give visual significance to its clockwise movement when the meter is energized.

In Figure 2, I have shown a further modification of the indicator portion of my invention in a complete indicating system. In this embodiment, the elements referred to by reference numerals 10, 11, 12, 13, 14, and 15 are again the same as those referred to with reference to Figure 1. A vane 27 is carried for rotation by a shaft 26 in a manner similar to vane 17 on shaft 16, but the normal position of the vane and shaft in Figure 2 is spaced clockwise with reference to the position shown in the figure so that none of it appears behind the translucent portion 13. The passage of current through the meter causes the vane to move in a counter-clockwise direction to expose more and more of the vane 27 behind the translucent portion 13 until at its maximum value the vane masks the translucent portion entirely. This modification embodies yet another diversity among members 11, 12, and 27: the visible surface of vane 27 is of an appearance which contrasts with that of airfoil section 12 and of dial 11. The visible surface of backing plate 28 is of a neutral appearance and I have shown it as having the same appearance as the dial 11 of the meter. The trailing edge of vane 27 is cut in the shape of an arc to give visual significance to its counter-clockwise movement when the meter is energized.

In Figure 2 I have also shown the indicator in my complete indicating system. I have indicated in dotted lines the conventional meter magnet 30 and armature 31, of the latter of which shaft 26 is a continuation. The indicator is provided with terminals 32 and 33 which are connected by conductors 34 and 35 to the output terminals 36 and 37 of an amplifier 38. The amplifier is provided with electrical energy from a suitable source 41, and one input terminal 42 of the amplifier is grounded as at 43. The other input terminal 44 of the amplifier is connected as by conductor 45 with a pick up device 46 mounted on and insulated from an airfoil 47 which is grounded as at 48. Pick up 46 and amplifier 38 may be of any suitable design, but I prefer to use such devices as are disclosed in the co-pending application of Waldo H. Kliever, Serial No. 463,259, filed October 24, 1942, and assigned to the assignee of the present invention. As clearly set forth in that application, accretion of ice on the airfoil 47 and pick up 46 causes unbalance in the electrical circuit of the amplifier and a resultant potential appears across the output terminals of the amplifier which is very closely related to the amount of icing on the airfoil. This will in turn cause a deflection of vane 27 (or vane 17 in the case of the species of Figure 1) which is proportional to the amount of icing. In either case, the meter will visually indicate a condition simulating in appearance the icing condition of the airfoil.

It will thus be seen that I have invented a new ice indicating system employing a novel meter which by its very appearance gives information regarding icing conditions on an airfoil surface without recourse to interpretation. It will also be apparent that there are other methods of bringing about this same object which will be apparent to those skilled in the art. An example of such a method is a mirror rotated by a meter movement and electrically illuminating more and more of a translucent portion in a manner analogous to my second modification. Since this and other similar expedients are such as will occur to those skilled in the art, I conceive my invention to be broad enough to include them, and the embodiments presented and sketched in this specification are to be considered as illustrative only; I wish the scope of my invention to be limited solely by the subjoined claims.

I claim as my invention:

1. In a system for indicating icing of an airfoil surface, an indicator comprising an airfoil simulating portion, an ice accretion simulating portion, and means varying the apparent boundary between said portions in response to variable icing of said surface.

2. In a system for indicating icing of an airfoil surface, a device giving incremental electrical response to incremental accretion of ice on said surface, means transmitting electrical energy in accordance with the responses of said device, and an indicator actuated by said electrical energy, said indicator comprising a portion simulating an airfoil section, a portion simulating ice accretion thereon, and means varying the apparent boundary between said portions, said last named means being operatively associated with said first named means for actuation thereby.

3. In a system for indicating icing of an airfoil surface, a device giving incremental electrical response to incremental accretion of ice on said surface, means transmitting electrical energy in accordance with the responses of said device, and an indicator actuated by said electrical energy, said indicator comprising a dial bearing a contrasting outline of an airfoil section, a portion of said section being light-transmitting, a backing member of appearance contrasting with that of said airfoil section and spaced from said dial, and a second member of appearance similar to that of said airfoil section movable between said dial and said backing member, whereby incrementally larger and smaller portions of said backing member may selectively become apparent through said light-transmitting portion, said second member being operatively associated with said first mentioned means for actuation thereby.

4. In a system for indicating icing of an airfoil surface, a device giving incremental electrical response to incremental accretion of ice on said surface, means transmitting electrical energy in accordance with the responses of said device, and an indicator actuated by said electrical energy, said indicator comprising a generally opaque dial bearing a contrasting outline of an airfoil section, a portion of said section being translucent, a source of light behind said translucent portion, and an opaque member of outline similar to a portion of said airfoil section responsively movable between said dial and said source, whereby incrementally larger and smaller portions of said translucent member may be selectively illuminated, said opaque member being operatively associated with said first mentioned means for actuation thereby.

5. In a system for indicating icing of an airfoil surface, a device giving incremental electrical response to incremental accretion of ice on said surface, means transmitting electrical energy in accordance with the responses of said device, and an indicator actuated by said electrical energy, said indicator comprising a dial bearing a contrasting outline of an airfoil section, a portion of said section being light-transmitting, a backing member of appearance similar to that of said airfoil section and spaced from said dial, and a second member of contrasting appearance responsively movable between said dial and said member, whereby incrementally larger and smaller portions of said second member may selectively become apparent through said light-transmitting portion, the effective edge of said second member having the outline of a portion of an airfoil section, said second member being operatively associated with said first-mentioned means for actuation thereby.

6. In a system for indicating icing of an airfoil surface, a device giving incremental electrical response to incremental accretion of ice on said surface, means transmitting electrical energy in accordance with the responses of said device, and an indicator, actuated by said electrical energy, said indicator comprising a dial bearing a contrasting outline of an airfoil section, a portion of said section being light-transmitting, a backing member of appearance contrasting with that of said airfoil section and spaced from said dial, and a second member of appearance similar to that of said airfoil section responsively movable between said dial and said backing member, whereby incrementally larger and smaller portions of said backing member may selectively become apparent through said light-transmitting portion, the effective edge of said second member having the outline of a portion of an airfoil section, said second member being operatively associated with said first mentioned means for actuation thereby.

7. In a device for indicating icing of an airfoil surface, an airfoil simulating portion, an ice accretion simulating portion, and means varying the apparent boundary between said portions.

8. In a system for indicating icing of an airfoil surface, an indicator comprising an airfoil simulating portion, an ice accretion simulating portion, and means varying the relative areas of said portions in response to variable icing of said surface.

9. In a system for indicating icing of an airfoil surface, a device giving incremental electrical response to incremental accretion of ice on said surface, means transmitting electrical energy in accordance with the responses of said device, and an indicator actuated by said electrical energy, said indicator comprising a portion simulating an airfoil section, a portion simulating ice accretion thereon, and means varying the relative areas of said portions, said last named means being operatively associated with said first named means for actuation thereby.

10. In a device for indicating icing of an airfoil surface, an indicator comprising an airfoil simulating portion, an ice accretion simulating portion, and means for varying the relative areas of said portions.

11. In combination, a device for selectively indicating the existence of a variable quantity of ice on an airfoil surface, comprising, a visual instrument having an airfoil simulating portion and an ice formation simulating portion, electrical means selectively responsive to the quantity of ice momentarily existing on said airfoil surface, and means associated with said instrument and controlled by said electrical means for varying the area between the said airfoil simulating portion and said ice formation simulating portion in accordance with the quantity of ice formation momentarily existing on said airfoil surface.

RUSSELL H. WHEMPNER.